US 8,280,393 B2

(12) United States Patent
Guo et al.

(10) Patent No.: US 8,280,393 B2
(45) Date of Patent: Oct. 2, 2012

(54) METHOD AND APPARATUS FOR BANDWIDTH RESOURCE ALLOCATION IN MOBILE COMMUNICATION SYSTEM

(75) Inventors: Zihua Guo, Beijing (CN); Weiwei Wang, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 1200 days.

(21) Appl. No.: 11/900,726

(22) Filed: Sep. 13, 2007

(65) Prior Publication Data

US 2008/0076440 A1 Mar. 27, 2008

(30) Foreign Application Priority Data

Sep. 13, 2006 (CN) .......................... 2006 1 0153830

(51) Int. Cl.
*H04W 72/00* (2009.01)
*H04W 4/00* (2009.01)
*H04L 12/28* (2006.01)

(52) U.S. Cl. .............. 455/452.2; 455/450; 455/452.1; 455/453; 370/338; 370/254; 370/341

(58) Field of Classification Search ............... 455/452.2, 455/450, 452.1, 453; 370/338, 254, 341
See application file for complete search history.

(56) References Cited

U.S. PATENT DOCUMENTS

| 6,574,476 | B1 | 6/2003 | Williams |
| 6,898,431 | B1 | 5/2005 | Peele |
| 2003/0032433 | A1* | 2/2003 | Daniel et al. .................. 455/452 |
| 2006/0109865 | A1 | 5/2006 | Park et al. |
| 2007/0213069 | A1* | 9/2007 | Ji et al. ........................... 455/450 |
| 2008/0253333 | A1* | 10/2008 | Hong et al. ................... 370/331 |

FOREIGN PATENT DOCUMENTS

WO 03105513 A2 12/2003

* cited by examiner

*Primary Examiner* — Patrick Edouard
*Assistant Examiner* — Timothy Pham
(74) *Attorney, Agent, or Firm* — Kinney & Lange, P.A.

(57) ABSTRACT

The invention discloses a method and an apparatus of bandwidth resource allocation in a mobile communication system. The methods is used for dividing sector bandwidth resource into private bandwidth resource for only users in its own sector and a public bandwidth resource. The bandwidth resource in the public bandwidth resource which is not allocated to users in its own sector for use can be lent to other sectors, and bandwidth resource in the public bandwidth resource which has been allocated to users, located at a central area, of its own sector for use can be multiplexed by other sectors. The method of bandwidth resource allocation in a mobile communication system according to the present invention utilizes the resource of the adjacent cells efficiently, and resolves the interference among cells due to the bandwidth resource borrowing/multiplexing.

14 Claims, 3 Drawing Sheets

METHOD AND APPARATUS FOR BANDWIDTH RESOURCE ALLOCATION IN MOBILE COMMUNICATION SYSTEM

BACKGROUND OF THE INVENTION

1. Field of Invention

The present invention relates to a multicarrier mobile communication system, particularly a method of scheduling bandwidth resource in the multicarrier mobile communication system.

2. Description of Prior Art

As a requirement for wideband service is increasing and multicarrier techniques (such as Orthogonal Frequency Division Multiplexing (OFDM) etc.) have been grown up, how to build up a new generation wireless cellular network becomes a problem to be solved.

For example, a current three-sector structure is a better scheme. However, since non-uniformity of a user distribution and a service distribution in the space would cause excessive bandwidth resource in some sectors and short of bandwidth resource in some other sectors, there is a need for flexibly scheduling the bandwidth resource among sectors in order to improve frequency spectrum utilization of the system.

Currently, the methods for improving the frequency spectrum utilization are as follows:

Static Channel Allocation: this method allocates a fixed bandwidth resource to each cell or sector. It is simple but can't well resolve the status of the non-uniformity of a user distribution and a service distribution;

Dynamic Channel Allocation: this method takes channels condition and inferences among cells into account, in order to allocate channel to respective cells in a centered or distributed way. The algorithm of the method is complex;

Mixed Channel Allocation: this method divides the bandwidth resource into two parts, one for static bandwidth resource which may only be used by its own cell and sector and the other for dynamic bandwidth resource which may perform a dynamic allocation among cells and sectors. It reduces complexity of bandwidth resource allocation in a certain extent, but is still complex for allocation of dynamic bandwidth resource.

U.S. patent application No. 2006/0109865 disclosed a scheme of spectrum bandwidth resource allocation in sectored cells, and disclosed two methods for resolving load equalization in cells.

The first method for load equalization is to inter-borrow bandwidth resource among different sub-sectors in one and the same cell. It doesn't take the interference on adjacent cells into account. Additionally, it may borrow bandwidth from adjacent sub-sector located in a cell different from the current cell. In the second method for load equalization, by changing widths of antenna beams in different sub-sectors, small beams are used in a sub-sector with a heavy load, and large beams are used in a sub-sector with a light load, so as to achieve the load equalization.

In the above technical schemes, when borrowing bandwidth from another sub-sector in one and the same cell, it neither takes the interference on adjacent cells into account, nor takes the situation of bandwidth resource multiplex from adjacent sub-sectors located in a cell different from the current cell into account.

SUMMARY OF THE INVENTION

An object of the present invention is to provide a method and an apparatus of bandwidth resource allocation in a mobile communication system, which can be used in a multicarrier mobile communication system. It can realize the maximum utilization of bandwidth resource in the case of small signaling overhead and little interference to the adjacent cell as possible.

To achieve the above object, the present invention provides a method of bandwidth resource allocation in a mobile communication system, wherein a sector bandwidth resource is divided into private bandwidth resource for only users in its own sector and public bandwidth resource; bandwidth resource in the public bandwidth resource which is not allocated to users in its own sector for use can be lent to other sectors, and bandwidth resource in the public bandwidth resource which has been allocated users located at the central area in its own sector for use can be multiplexed by other sectors.

The borrowable bandwidth resource is the idle public resource. The multiplexable bandwidth resource is the public resource allocated to the users located at a central area of the sector.

In the above method, the first sector uses bandwidth resource which is intersection of an idle public bandwidth resource owed by other sectors in one and the same cell in which the first sector is located with a borrowable and multiplexable public bandwidth resource owed by the cell adjacent to the first sector, when the bandwidth resource allocated to a first sector by the system can't satisfy the requirement of users, and other sectors in one and the same cell in which the first sector is located have the idle public bandwidth resource.

In the above method, the system firstly allocates the private bandwidth resource to users for use when allocating resource to users in the sector, and allocates the public bandwidth resource to users for use when the private bandwidth resource is insufficient.

In the above method, the public bandwidth resource is preferentially allocated to users in a center area when allocating the public bandwidth resource.

In the above method, the bandwidth resource belonging to the borrowable bandwidth resource in the bandwidth resource, which is intersection of the borrowable and multiplexable public bandwidth resource with the idle public bandwidth resource owed by other sectors in one and the same cell in which the first sector is located, is preferentially allocated to users in the first sector for use, when the bandwidth resource, which is intersection of the borrowable and multiplexable public bandwidth resource with the idle public bandwidth resource owed by other sectors in one and the same cell in which the first sector is located, is more than the bandwidth resource required for the first sector.

In the above method, the bandwidth resource belonging to the multiplexable bandwidth resource in the bandwidth resource, which is intersection of the borrowable and multiplexable public bandwidth resource with the idle public bandwidth resource owed by other sectors in one and the same cell in which the first sector is located, is preferentially allocated to users in the center area for use, when it is allocated to be used by users in the first sector for use.

In the above method, the sector doesn't allocate one and the same bandwidth resource simultaneously to other sectors in the one and same virtual cell.

To better achieve the object as described above, the present invention further provides an apparatus of bandwidth resource allocation in a mobile communication system which is arranged in a base station, wherein a sector bandwidth resource is divided into a private bandwidth resource for only users in its own sector and a public bandwidth resource; bandwidth resource in the public bandwidth resource which is not allocated to users in its own sector for use can be lent to other sectors, and bandwidth resource in the public bandwidth resource which has been allocated to users located at the central area in its own sector for use can be multiplexed by other sectors.

The above apparatus is further used for allocating the bandwidth resource, which is intersection of the idle public bandwidth resource owed by other sectors in one and the same cell in which the first sector is located with the borrowable and multiplexable public bandwidth resource owed by the cell adjacent to the first sector simultaneously, to the first sector for use, when the bandwidth resource allocated to a first sector by the system can't satisfy the requirement of users, and other sectors in one and the same cell in which the first sector is located have idle public bandwidth resource.

The above apparatus comprises in detail:

a division module for sector bandwidth resource, which is configured for dividing the sector bandwidth resource into a private bandwidth resource for only users in its own sector and a public bandwidth resource;

a decision module for determining whether or not the bandwidth resource allocated to the first sector by the system can satisfy the requirement of users, and whether or not other sectors in one and the same cell in which the first sector is located have an idle public bandwidth resource;

a bandwidth resource borrowing and multiplexing module for allocating the bandwidth resource, which is intersection of the idle public bandwidth resource owed by other sectors in one and the same cell in which the first sector is located with the borrowable and multiplexable public bandwidth resource owed by the cell adjacent to the first sector, to the first sector for use.

According to the method of bandwidth resource allocation in the mobile communication system, when the bandwidth resource allocated by the system can't satisfy the requirement of users, the first sector uses bandwidth resource which is intersection of the idle public bandwidth resource owed by other sectors in one and the same cell in which the first sector is located with borrowable and multiplexable public bandwidth resource of the cell adjacent to the first sector. It efficiently utilizes the resource of the adjacent cell. since the borrowed/multiplexed resource isn't used by other sectors in the same cell in which the first sector is located, interference on this cell may not be caused.

According to the present invention, the bandwidth resource allocated to the sectors is divided into a private bandwidth resource and a public bandwidth resource, and only the public bandwidth resource can be borrowed/multiplexed. Meanwhile, when allocating the borrowable and multiplexable bandwidth resource owed by the cell adjacent to the cell in which the first sector is located, the borrowable bandwidth resource in the public bandwidth resource is preferentially allocated. When the multiplexable bandwidth resource must be used, it is preferably allocated to users in the center area for use. The users with the same bandwidth resource are space-separated, thereby to cause the interference among adjacent cells due to, the bandwidth resource borrowing/multiplexing to be further reduced.

DETAILED DESCRIPTION OF PREFERRED EMBODIMENTS

Figure 1:
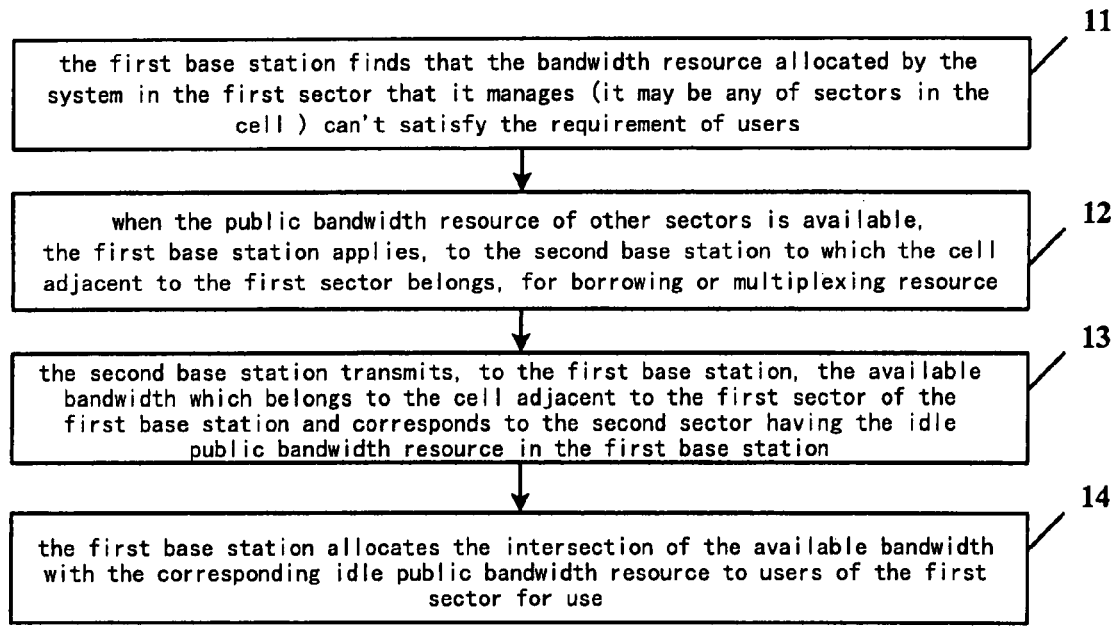
FIG. 1 is an illustrative flowchart according to the first embodiment of the present invention.

Before the present invention is explained in detail, some conceptions involved in the present invention are explained in order to better describe the detail implementation of the present invention.

The present invention takes three-sector as an example to be explained. Bandwidth resource allocated to each sector of the three sectors is ⅓ of the total bandwidth resource of the system.

In the present invention, the bandwidth resource allocated to each sector is firstly divided into two parts: a private bandwidth resource and a public bandwidth resource.

The private bandwidth resource can only be used by users in its own sector and this part of bandwidth resource may be used by users at any position of the sector. When allocating the bandwidth resource, the private bandwidth resource is firstly allocated to users.

The public bandwidth resource can be borrowed or multiplexed by other sectors. When users in its own sector exhaust the private bandwidth resource, they would use the public bandwidth resource. Meanwhile, when allocating the public bandwidth resource, the public bandwidth resource is preferentially allocated to users in a center area. The caused benefits will be explained in detail in conjunction with the detailed network as below.

In the method according to the present invention, when the bandwidth resource allocated to a first sector by the system can't satisfy the requirement of users, and an idle public bandwidth resource is available in other sectors in one and the same cell in which the first sector is located, a bandwidth resource which is intersection of the idle public bandwidth resource with the borrowable and multiplexable public bandwidth resource owed by the cell adjacent to the first sector is used in the first sector.

When the bandwidth resource which is intersection of the idle public bandwidth resource with the borrowable public bandwidth resource of the cell adjacent to the first sector (the idle public bandwidth resource of the cell adjacent to the first sector) is used in the first sector, this is called bandwidth borrow.

When the bandwidth resource which is intersection of the idle public bandwidth resource with the multiplexable public bandwidth resource of the cell adjacent to the first sector (the public bandwidth resource which has been used by the center users in the cell adjacent to the first sector) is used in the first sector, this is called bandwidth multiplex. Of course, fundamentally, both the bandwidth borrow and the bandwidth multiplex mean that the first sector borrows the public bandwidth resource of other sectors in the one and the same cell in which the first sector is located.

The center area refers to a position near to the base station, e.g. an area away from the base station by 300 m. Of course, the size of the center area is not fixed, and can be determined according to distribution of users in the cell in practice, which will not cause deterioration of interference among cells in the borrow and multiplex mechanism of the present invention and will avoid reduction of throughput in cells.

The private bandwidth should satisfy requirement of users in usual. Meanwhile, it should consider bandwidths reserved for users newly accessing to it and users handed-over from other sectors. In a normal case, for example, if users in some sector need 40% of bandwidth of this sector, while 20% of bandwidth of this sector is reserved for users newly accessing to it and users handed-over from other sectors, the private bandwidth of this sector occupies 60% of bandwidth of this sector, while the remaining 40% of bandwidth is used for the public bandwidth.

The proportion of the public bandwidth and the private bandwidth in each sector may be different from each other. The setting of the public bandwidth and the private bandwidth in each sector can be determined according to an actual on-site test.

As shown in FIG. 1, the method of bandwidth resource allocation in the mobile communication system according to the first embodiment of the present invention comprises the steps as follows:

At Step 11, the first base station finds that the bandwidth resource allocated by the system in the first sector that it manages (it may be any of sectors in the cell) can't satisfy the requirement of users;

At Step 12, the first base station obtains use status on the public bandwidth resource of other sectors (which are called second sectors for the convenience of description; in the case of three-sector network structure, there are two second sectors) in the cell where the first sector is located. If the public bandwidth resource of the second sectors is available, the first base station transmits application message for bandwidth resource to the second base station to which the cell adjacent to the first sector belongs. The application message for bandwidth resource transmit from the first sector to the second base station includes an identification for the second sector having the idle public bandwidth resource. Herein, in the structure of three-sector network, there should be two second base station.

At Step 13, according to the application message for bandwidth resource, the second base station transmits to the first base station an available bandwidth resource of the sector which belongs to the cell adjacent to the first sector of the first base station and corresponds to the second sector having the idle public bandwidth resource in the first base station. This available bandwidth resource is a union set of the borrowable public bandwidth resource and the multiplexable bandwidth resource.

At Step 14, the first base station allocates the intersection of the available bandwidth resource with the corresponding idle public bandwidth resource, to users in the first sector for use.

In the case of three sectors, assuming that only one of the second sectors has idle public bandwidth resource, the bandwidth resource used ultimately by first sector is the intersection of the two available bandwidth resources transmitted by the second base stations (each of the second base stations transmits one available bandwidth resource) with the corresponding idle public bandwidth resource. If both the two second sectors have idle public bandwidth resource, the bandwidth resource used ultimately by first sector is the union set of two intersections.

The method of bandwidth resource allocation in the mobile communication system according to the present invention further comprises the following step: the first base station informs the second base station of use status on the borrowed and multiplexed public bandwidth resource after allocating the borrowed and multiplexed public bandwidth resource, so that the second base station can reallocate its own bandwidth resource according to the use status of the bandwidth resource in the first sector.

Hereinafter, the present invention is explained in detail in conjunction with a specific network.

Figure 2:
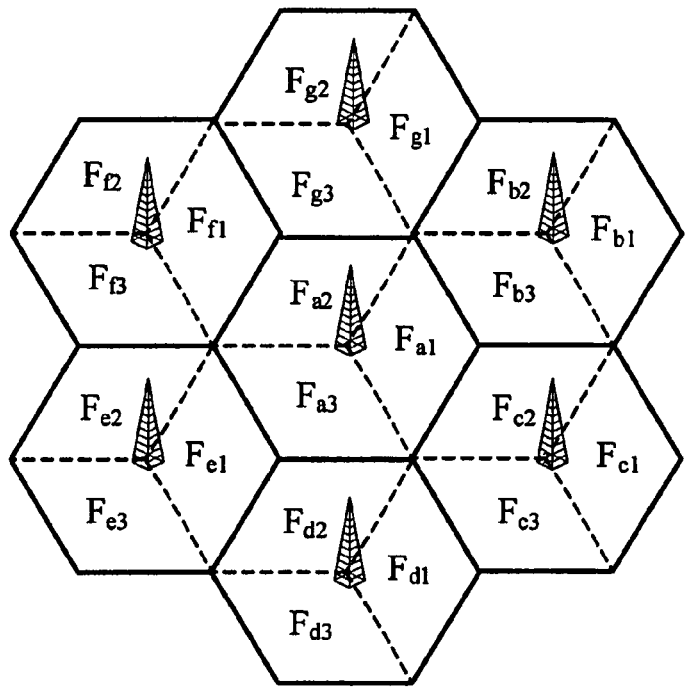
FIG. 2 is a schematic view of a cellular network structure.

As shown in FIG. 2, it is a schematic view of a networking structure consisting of a plurality of three-sector cells, wherein:

$F_{ij}$ (i indicates a, b, c . . . ) is a cell number, j is 1, 2, 3 in the case of the three-sector structure. As shown in FIG. 1, $F_{a3}$ indicates the third sector of Cell a. The base station to which the sector belongs is indicated by a capital letter, such as Base Station A. The cell to which the sector belongs is indicated by a lowercase letter, such as Cell a.

With reference to the network structure as shown in FIG. 2, assuming that the current bandwidth resource $F_{a1}$ can't satisfy the requirement of users, Step 12 comprises the following steps in detail:

At Step 121, Base Station A (the first base station) obtains the use status on the public bandwidth resource (sets $iBW_{a2}$ and $iBW_{a3}$ of the remaining public bandwidth resource of $F_{a2}$ and $F_{a3}$) of other Sectors $F_{a2}$ and $F_{a3}$ (the second sectors) in one and the same cell where Sectors $F_{a1}$ (the first sector) is located.

At Step 122, Base Station A decides the application for bandwidth resource borrow and multiplex according to $iBW_{a2}$ and $iBW_{a3}$, which comprises the following cases:

$iBW_{a2}$ and $iBW_{a3}$ are empty. Sector $F_{a1}$ can't borrow and multiplex any of bandwidth resources since once borrowed and multiplexed, it will cause severe interference on the current cell, and the process is terminated.

$iBW_{a2}$ is empty and $iBW_{a3}$ is non-empty. Base Station A transmits the application message for bandwidth resource to Base Station B and Base Station C (the second base stations) to which the cell adjacent to Sector $F_{a1}$ (the cell is located in the direction that the sector directs towards and is adjacent to the sector, for example, the cells adjacent to Sector $F_{a1}$ are Cell b and Cell c) belongs, in order to apply for the borrow and multiplex of bandwidth resource. The application message for bandwidth resource by which Base Station A applies to Base Station B and Base Station C for borrowing and multiplexing bandwidth resource includes the status about the idle public bandwidth resource that $F_{a3}$ has;

$iBW_{a2}$ is non-empty and $iBW_{a3}$ is empty. Base Station A transmits the application message for bandwidth resource to Base Station B and Base Station C to which the cell adjacent to Sector $F_{a1}$ belongs, in order to apply for the borrow and multiplex of bandwidth resource. The application message for bandwidth resource by which Base Station A applies to Base Station B and Base Station C for borrowing and multiplexing bandwidth resource includes the status about the idle public bandwidth resource that $F_{a2}$ has;

$iBW_{a2}$ is non-empty and $iBW_{a3}$ is non-empty. Base Station A transmits the application message for bandwidth resource to Base Station B and Base Station C to which the cell adjacent to Sector $F_{a1}$ belongs, in order to apply for the borrow and multiplex of bandwidth resource. The application message for bandwidth resource by which Base Station A applies to Base Station B and Base Station C for borrowing and multiplexing bandwidth resource includes the status about the idle public bandwidth resources that $F_{a2}$ and $F_{a3}$ have.

In the case that $IBW_{a3}$ is non-empty and $iBW_{a2}$ is empty, an example will be explained in the following.

In Step 13, Base Station B informs Base Station A of the available bandwidth resource of Sector $F_{b3}$ (including the borrowable public bandwidth resource $bBW_{b3}$ and the multiplexable public bandwidth resource $rBW_{b3}$). Base Station C informs Base Station A of the available bandwidth resource of Sector $F_{c3}$ (including the borrowable public bandwidth resource $bBW_{c3}$ and the multiplexable public bandwidth resource $rBW_{c3}$).

In Step 14, Base Station A ultimately determines the bandwidth resource reallocated to Sector $F_{a1}$ for use as shown:
$\{iBW_{a3} \cap (bBW_{b3} \cup rBW_{b3}) \cap (bBW_{c3} \cup rBW_{c3})\}$ If $iBW_{a2}$ is also non-empty (i.e. $iBW_{a2}$ is non-empty and $iBW_{a3}$ is also non-empty), Base Station A ultimately determines that the bandwidth resource reallocated to Sector $F_{a1}$ for use further comprises the intersection of intersection of the available bandwidth resource of $F_{b2}$ and the available bandwidth resource of $F_{c2}$, with the remaining public bandwidth resource as follows:
$\{iBW_{a2} \cap (bBW_{b2} \cup rBW_{b2}) \cap (bBW_{c2} \cup rBW_{c2})\}$ Since the bandwidth resource reallocated ultimately to Sector $F_{a1}$ for use doesn't include the bandwidth resource already used by the second sectors (Sector $F_{a2}$ and Sector $F_{a3}$), the interference caused by bandwidth resource borrow and multiplex is well resolved.

Meanwhile, when Base Station A ultimately allocates to Sector $F_{a1}$ the bandwidth resource of an adjacent cell, if the bandwidth resource reallocated to Sector $F_{a1}$ for use is more than the bandwidth resource required by Sector $F_{a1}$, the borrowable public bandwidth resource is preferentially allocated to users in Sector $F_{a1}$. Only when the borrowable public bandwidth resource isn't sufficient, the multiplexable public bandwidth resource is allocated to users in Sector $F_{a1}$. Thereby, the public bandwidth resource that even the adjacent cell hasn't used yet (the borrowable bandwidth resource) is preferentially used as possible, causing the interference on the adjacent cells due to the bandwidth resource borrow and multiplex to be further reduced.

Meanwhile, when allocating the multiplexable public bandwidth resource, it is allocated to users near to the base station for use. Thereby, the distance among users using the multiplexable public bandwidth resource in adjacent cells becomes as far as possible, thereby causing the interference on the adjacent cells due to the bandwidth resource borrow and multiplex to be further reduced.

In the first embodiment of the present invention, the first base station (Base Station A) ultimately determines the bandwidth resource reallocated to the first sector (Sector $F_{a1}$) for use. In the second embodiment of the present invention, the first base station and the second base station determine the bandwidth resource reallocated to the first sector (Sector $F_{a1}$) for use altogether.

Figure 3:
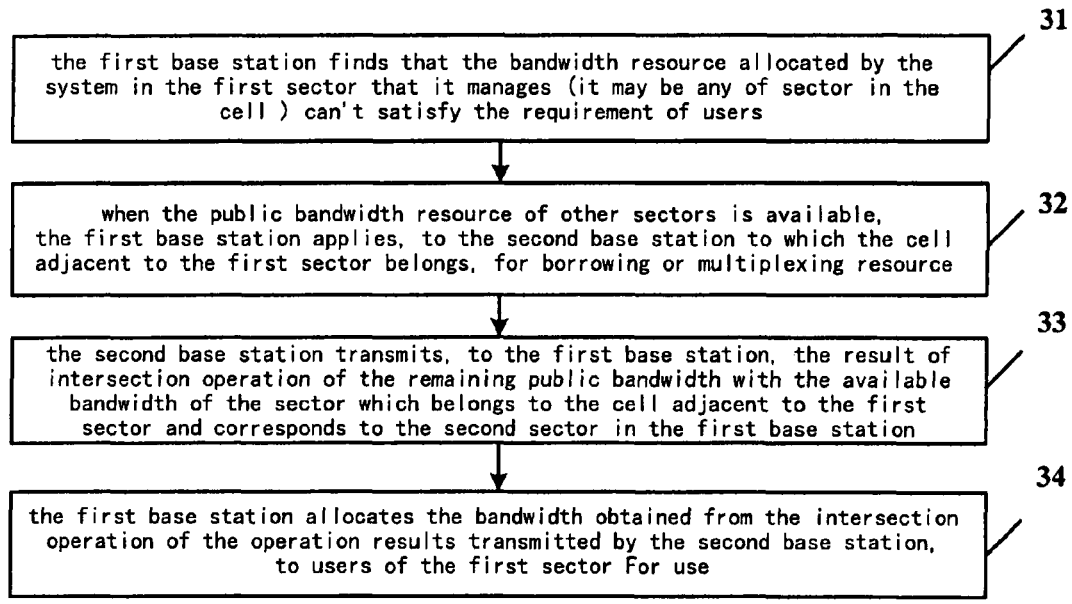
FIG. 3 is an illustrative flowchart according to the second embodiment of the present invention.

The second embodiment of the present invention will be explained with reference to the case where $iBW_{a2}$ is non-empty and $iBW_{a3}$ is non-empty and in connection with the network as shown in FIG. 3.

As shown in FIG. 3, the second embodiment of the present invention comprises the following steps in detail:

At Step 31, the first base station (Base Station A) finds that the bandwidth resource allocated by the system in the first sector (Sector $F_{a1}$) that it manages can't satisfy the requirement of users.

At Step 32, the first base station (Base Station A) obtains the use status on the public bandwidth resource in the second sectors (Sector $F_{a2}$, Sector $F_{a3}$) in the cell where the first sector (Sector $F_{a1}$) is located. When the public bandwidth resource of the cell where the second sector is available (the public bandwidth resource in Sector $F_{a2}$ is available), the first base station transmits an application message for bandwidth resource to the second base stations (Base Station B, Base Station C) to which the cell adjacent to the first sector belongs. The application message for bandwidth resource transmitted from the first base station (Base Station A) to the second base stations (Base Station B, Base Station C) includes an identification for the second sector (Sector $F_{a2}$) having the idle public bandwidth resource and the corresponding remaining public bandwidth resource $iBW_{a2}$.

At Step 33, according to the identification for the second sector having the idle public bandwidth resource included in the application message for bandwidth resource, the second base stations (Base Station B, Base Station C) transmit to the first base station the result of intersection operation $(\{iBW_{a2} \cap (bBW_{b2} \cup rBW_{b2})\}, \{iBW_{a2} \cap (bBW_{c2} \cup rBW_{c2})\})$ among the remaining public bandwidth resource $iBW_{a2}$ of the second sector having the idle public bandwidth resource, and the available bandwidth resource of the sectors (Sector $F_{b2}$, Sector $F_{c2}$) which belongs to the cell adjacent to the first base station and corresponds to the second sector having the idle public bandwidth resource in the first base station.

At Step 34, the first base station allocates the bandwidth resource obtained from the intersection operation on the operation results transmitted by the second base stations, to users of the first sector for use.

When $iBW_{a2}$ is non-empty and $iBW_{a3}$ is non-empty, the first base station performs union set operation on the operation results corresponding to the two sectors, and allocates the obtained bandwidth resource to users in the first sector for use.

Meanwhile, the method of bandwidth resource allocation in the mobile communication system according to the present invention can further comprise the following step: the first base station informs the second base stations of the use status on the borrowed and multiplexed public bandwidth resource after allocating the borrowed and multiplexed public bandwidth resource, so that the second base stations can reallocate its own bandwidth resource according to the use status of the bandwidth resource in the first sector.

Meanwhile, the second base stations determine the borrowable and multiplexable bandwidth resource according to the following principles:

1. The same spectrum bandwidth resource can't be allocated to sectors in the same virtual cell (consisting of three adjacent sectors located in different cells);
2. The borrowable public bandwidth resource (i.e. the idle public bandwidth resource) is preferentially allocated to applicants. If it isn't sufficient, the multiplexable public bandwidth resource can be allocated to the applicants.

The principles will be explained in detail in conjunction with a specific network.

$F_{a1}$□$F_{b3}$ and $F_{c2}$ are sectors located in one and the same virtual cell. Assuming that two sectors in the same virtual cell apply to the third sector for borrowing and multiplexing the bandwidth resource simultaneously, for example, $F_{a1}$ and $F_{b3}$ apply to $F_{c2}$ for bandwidth resource simultaneously, and assuming that $F_{a2}$ and $F_{b2}$ have remaining public bandwidth resource, and $F_{a3}$ and $F_{b1}$ have no remaining public bandwidth resource, the base station to which Cell C belongs takes into account, the remaining public bandwidth resource $iBW_{a2}$ of $F_{a2}$, the number of channels $nBW_{a1}$ required by $F_{a1}$, the remaining public bandwidth resource $iBW_{b2}$ of $F_{b2}$ and the number of channels $nBW_{b3}$ required by $F_{b3}$, altogether. If the remaining public bandwidth resource of $F_{c2}$ can satisfy the requirement of both $F_{a1}$ and $F_{b3}$ simultaneously, a suitable bandwidth resource can be allocated to two sectors. If the remaining public bandwidth resource of $F_{c2}$ can only satisfy the requirement of one of $F_{a1}$ and $F_{b3}$, the bandwidth resource is firstly allocated to this sector, and the remaining bandwidth resource is allocated to the other sector. If neither of them can be satisfied, the bandwidth resource is allocated to these two sectors averagely.

In the embodiments as described above, the return of the borrowed and multiplexed resource is not illustrated. The implementation for returning the borrowed and multiplexed resource will be described in the following.

The sector borrowing and multiplexing the bandwidth resource, such as $F_{a1}$, can only use the borrowed and multiplexed resource within a certain period of time. If time is out, the sector borrowing and multiplexing the public bandwidth resource releases the borrowed and multiplexed public bandwidth resource automatically, in order to realize automatic return of resource. The base station in which $F_{a1}$ is located may inform the origin cell that the bandwidth resource has been released, without transmission of a message. Herein, time T can be set by the system.

Of course, if the bandwidth resource has been exhausted before timeout, the sector borrowing and multiplexing the public bandwidth resource informs its origin cell that the borrowed and multiplexed resource has been released, after releasing the borrowed and multiplexed public bandwidth resource automatically.

Meanwhile, if it is in the process of using the bandwidth resource, and the cell lending the resource informs the first base station that it needs to use the resource, the first base station needs to release the resource and informs the cell lending the resource of it.

The apparatus for bandwidth resource allocation in a mobile communication system is arranged in a base station. The apparatus is used for dividing a sector bandwidth resource into a private bandwidth resource for only users in its own sector and a public bandwidth resource. Bandwidth resource in the public bandwidth resource which is not allocated to users in its own sector for use can be lent to other sectors. Bandwidth resource in the public bandwidth resource which has been allocated to users located in the central area in its own sector for use can be multiplexed to other sectors.

Meanwhile, when the bandwidth resource allocated to a first sector by the system can't satisfy the requirement of users, and other sectors in one and the same cell in which the first sector is located have the idle public bandwidth resource, the apparatus for bandwidth resource allocation is further used for allocating to the first sector the bandwidth resource, which is intersection of the idle public bandwidth resource with the borrowable and multiplexable public bandwidth resource owed by the cell adjacent to the first sector.

The apparatus for bandwidth resource allocation according to the invention comprises in detail:

a division module for sector bandwidth resource, which is configured for dividing the sector bandwidth resource into a private bandwidth resource for only users in its own sector and a public bandwidth resource;

a decision module for determining whether or not the bandwidth resource allocated to the first sector by the system can satisfy the requirement of users, and whether or not other sectors in one and the same cell in which the first sector is located have idle public bandwidth resource; and a bandwidth resource borrow and multiplex module for allocating to the first sector the bandwidth resource, which is intersection of the idle public bandwidth resource with the borrowable and multiplexable public bandwidth resource owed by the cell adjacent to the first sector.

Figure 4:
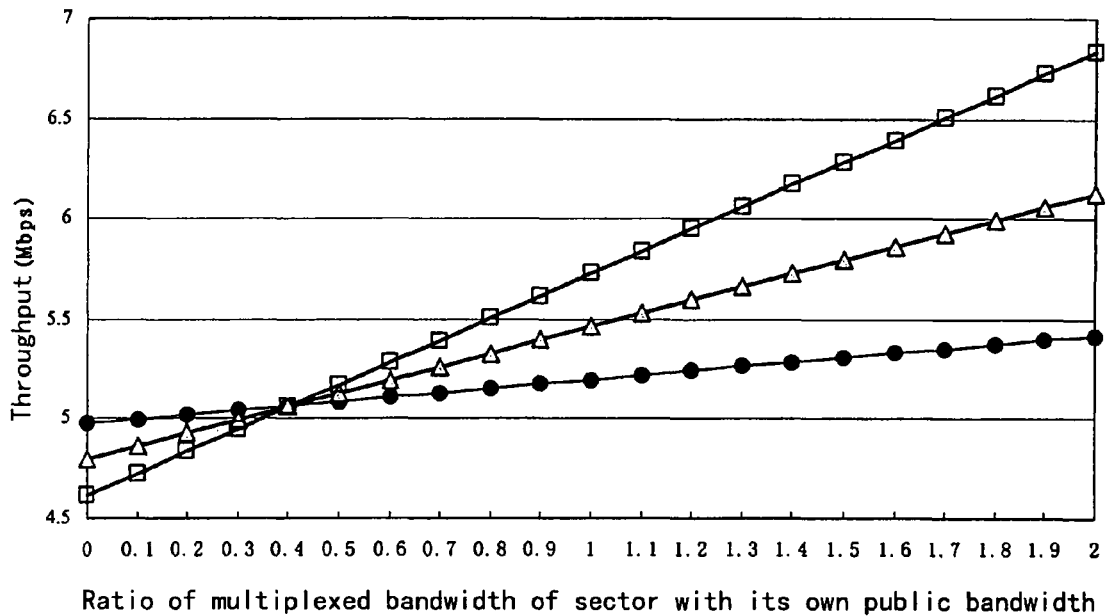
FIGS. 4, 5 and 6 are schematic views for effect caused by application of the present invention.

FIG. 4 is a schematic view for the varying status of throughput in the case that the interference is the most severe, while Sector $F_{a1}$ multiplexes the bandwidth resource of an adjacent sector according to the method of the invention. Herein, the abscissa indicates the ratio of the bandwidth resource of the adjacent sector multiplexed by Sector $F_{a1}$ with its own public bandwidth resource, and the ordinate indicates the throughput of sector.

Figure 5:
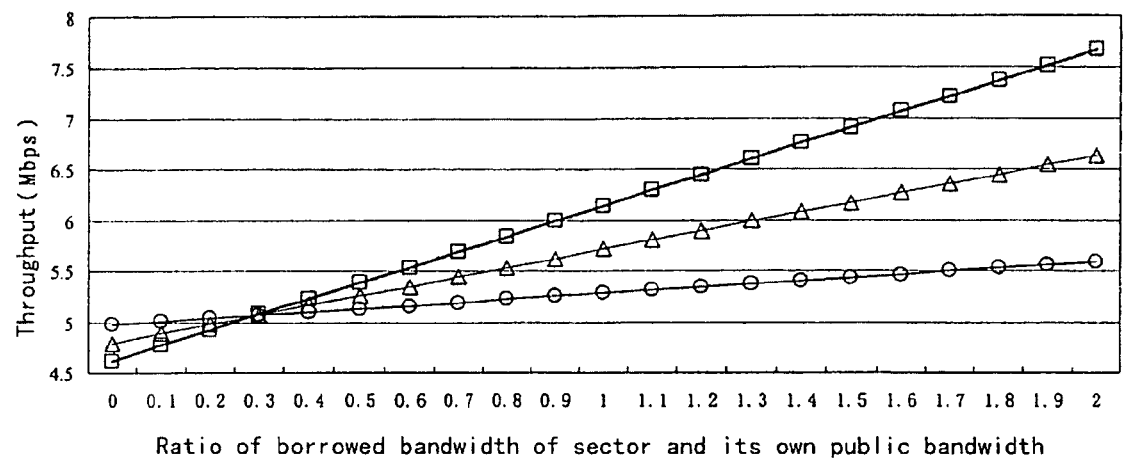

FIG. 5 is a schematic view for the varying status of throughput in the case that the interference is the most severe, while Sector $F_{a1}$ borrows the bandwidth resource of an adjacent sector according to the method of the invention. Herein, the abscissa indicates the ratio of the bandwidth resource of the adjacent sector borrowed by Sector $F_{a1}$ with its own public bandwidth resource, and the ordinate indicates the throughput of sector.

In FIG. 4 and FIG. 5, lines with squares, triangles and circles indicate that the proportion occupied by the borrowed bandwidth resource varies with the throughput, in the different cases that the proportion for the public bandwidth resource is 10%, 30% and 50% respectively.

Figure 6:
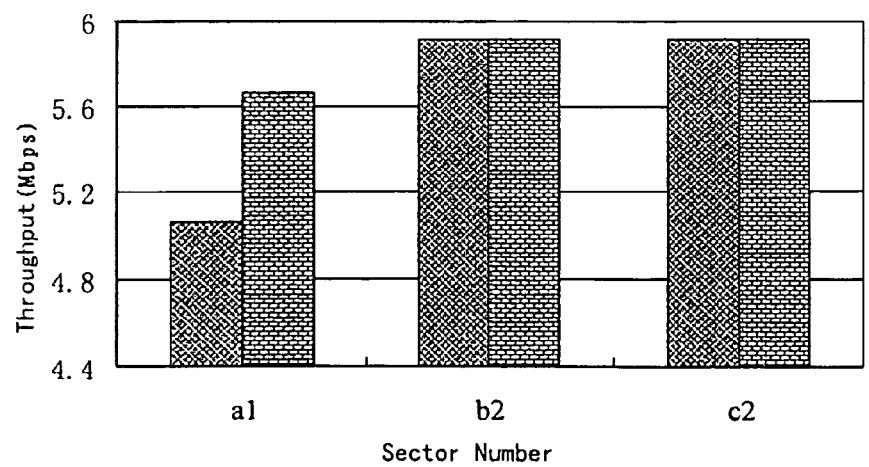

Assume that $F_{a1}$ multiplexes the bandwidth resource of $F_{b2}$ and $F_{c2}$ (20% of the public bandwidth resource) since $F_{a2}$ has idle bandwidth resource as shown in FIG. 2. It gives the situation that the bandwidth resource $F_{a1}$ increases and the bandwidth resource of other sectors as shown in FIG. 6. As seen from FIG. 6, the throughput of $F_{a1}$ is significantly increased (5.1 Mbps to 5.7 Mbps), while throughput of other sectors are slightly decreased.

As seen from FIG. 4, FIG. 5 and FIG. 6, by applying the method of the invention, it can increase the throughput of sector and improve the utilization of spectrum, and it has little effect on other sectors.

The above only illustrates the preferred embodiments of the present invention. Those ordinary skilled in the art can appreciate that any improvements and changes to the present invention are possible without departing from the principle of the present invention, which are regarded within the protection range of the present invention.

What is claimed is:

1. A method of bandwidth resource allocation in a mobile communication system, the method comprising:
dividing, performed by at least one base station in the mobile communication system, a sector bandwidth resource into a private bandwidth resource for only users in its own sector and a public bandwidth resource, wherein bandwidth resource in the public bandwidth resource which is not allocated to users in its own sector for use can be lent to other sectors, and wherein bandwidth resource in the public bandwidth resource which has been allocated to users located at a central area in its own sector for use can be multiplexed by other sectors, wherein a first sector uses bandwidth resource which is an intersection of idle public bandwidth resource owed by other sectors in the same cell in which the first sector is located with borrowable and multiplexable public bandwidth resource owed by a cell adjacent to the first sector, when the bandwidth resource allocated to the first sector by the system cannot satisfy requirements of users, and other sectors in the same cell in which the first sector is located have an idle public bandwidth resource.

2. The method according to claim 1, wherein the system firstly allocates the private bandwidth resource to users for use when allocating resource to users in the first sector, and allocates the public bandwidth resource to users for use when the private bandwidth resource is insufficient.

3. The method according to claim 2, wherein the public bandwidth resource is preferentially allocated to users in a center area when allocating the public bandwidth resource.

4. The method according to claim 1, wherein the bandwidth resource belonging to the borrowable bandwidth resource in the bandwidth resource, which is intersection of the borrowable and multiplexable public bandwidth resource with the idle public bandwidth resource owed by other sectors in one and the same cell in which the first sector is located, is preferentially allocated to users in the first sector for use, when the bandwidth resource, which is intersection of the borrowable and multiplexable public bandwidth resource with the idle public bandwidth resource owed by other sectors in one and the same cell in which the first sector is located, is more than the bandwidth resource required for the first sector.

5. The method according to claim 1, wherein the bandwidth resource belonging to the multiplexable bandwidth resource in the bandwidth resource, which is intersection of the borrowable and multiplexable public bandwidth resource with the idle public bandwidth resource owed by other sectors in one and the same cell in which the first sector is located, is preferentially allocated to users in the center area for use, when it is allocated to users in the first sector for use.

6. The method according to claim 1, wherein the first sector does not allocate one and the same bandwidth resource simultaneously to other sectors in the one and same cell.

7. The method according to claim 1, further comprising the steps of:
finding with a first base station that the bandwidth resource allocated by the system in the first sector that the first base station manages cannot satisfy the requirement of users;
obtaining with the first base station a use status on the public bandwidth resource of a second sector in the cell where the first sector is located;
when the public bandwidth resource in the second sector is available, transmitting from the first base station to a second base station to which a cell adjacent to the first sector belongs, an application message for bandwidth resource including an identification for the second sector having the idle public bandwidth resource;
transmitting with the second base station, according to the application message for bandwidth resource, to the first base station, the borrowable and multiplexable public bandwidth resource of the sector which belongs to the cell adjacent to the first sector of the first base station and corresponds to the second sector having the idle public bandwidth resource in the first base station; and
allocating with the first base station the intersection of the borrowable and multiplexable public bandwidth resource with the corresponding idle public bandwidth resource to users in the first sector for use.

8. The method according to claim 7, further comprising:
informing the second base station with the first base station of the allocation status on the borrowable and multiplexable public bandwidth resource.

9. The method according to claim 7, further comprising:
releasing with the first sector the borrowed and multiplexed public bandwidth resource automatically after a certain period of time.

10. The method according to claim 1, further comprising:
finding with the first base station that the bandwidth resource allocated by the system in the first sector that it manages cannot satisfy the requirement of users;
obtaining with the first base station a use status on the public bandwidth resource of the second sector in the cell where the first sector is located;
when the public bandwidth resource of the second sector is available, transmitting an application message for bandwidth resource from the first base station to the second base station to which the cell adjacent to the first sector belongs; the application message for bandwidth resource includes an identification for the second sector having the idle public bandwidth resource and the corresponding remaining public bandwidth resource;
transmitting from the second base station to the first base station, according to the identification for the second sector having the idle public bandwidth resource, a result of intersection operation of the remaining public bandwidth resource of the second sector having the idle public bandwidth resource, with the borrowable and multiplexable public bandwidth resource of the sector which belongs to the cell adjacent to the first sector and corresponds to the second sector having the idle public bandwidth resource in the first base station;
allocating with the first base station the bandwidth resource obtained from the intersection operation of the operation results transmitted by the second base station, to users of the first sector for use.

11. The method according to claim 10, further comprising:
informing the second base station with the first base station of the allocation status on the borrowable and multiplexable public bandwidth resource.

12. The method according to claim 10, comprising:
releasing from the first sector the borrowed and multiplexed bandwidth resource automatically after a certain period of time.

13. An apparatus of bandwidth resource allocation for a mobile communication system, the apparatus comprising:
a base station;
a first cell associated with the base station;
a plurality of sectors within the first cell;
a sector bandwith resource for each of the plurality of sectors, wherein each sector bandwidth resource is divided into a private bandwidth resource for only users in its own sector and a public bandwidth resource, and wherein each sector bandwidth resource in the public bandwidth resource which is not allocated to users in its own sector for use can be lent to other sectors, and each sector bandwidth resource in the public bandwidth resource which has been allocated to users located at a central area in its own sector for use can be multiplexed by other sectors, wherein the apparatus is further configured for allocating bandwidth resource, which is an intersection of idle public bandwidth resource owed by other sectors in the first cell in which the first sector is located with borrowable and multiplexable public bandwidth resource owed by a second cell adjacent to the first sector, to the first sector for use, when the bandwidth resource allocated to the first sector by the system cannot satisfy requirements of users, and other sectors in the same cell in which the first sector is located have idle public bandwidth resource.

14. The apparatus according to claim 13, comprising:
a division module for the first sector bandwidth resource, which is configured for dividing the first sector bandwidth resource into the private bandwidth resource for only users in its own sector and the public bandwidth resource;
a decision module for determining whether or not the sector bandwidth resource allocated to the first sector by the apparatus can satisfy the requirement of users, and whether or not other sectors in the first cell in which the first sector is located have an idle public bandwidth resource; and
a bandwidth resource borrowing and multiplexing module for allocating the bandwidth resource, which is intersection of the idle public bandwidth resource owed by other sectors in the first cell in which the first sector is located with the borrowable and multiplexable public bandwidth resource owed by the second cell adjacent to the first sector, to the first sector for use.

* * * * *